J. B. EDINGS.
TRAIN INDICATING APPARATUS.
APPLICATION FILED SEPT. 20, 1909. RENEWED NOV. 9, 1910.
996,069.
Patented June 27, 1911.
3 SHEETS—SHEET 2.
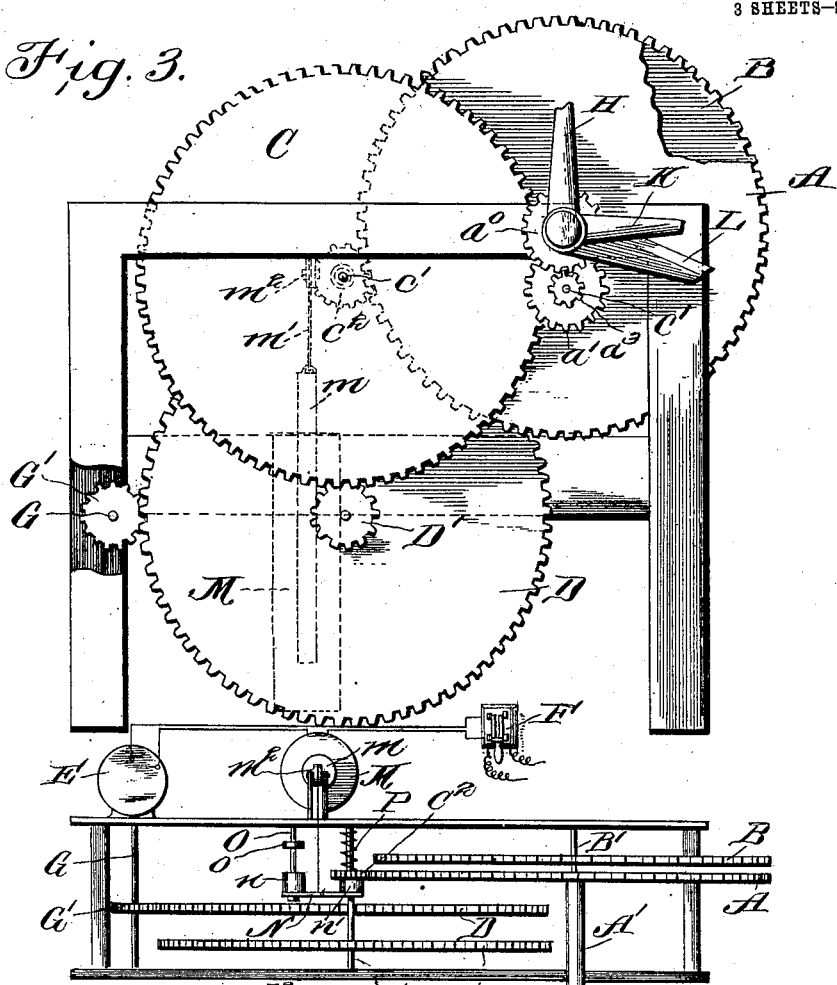
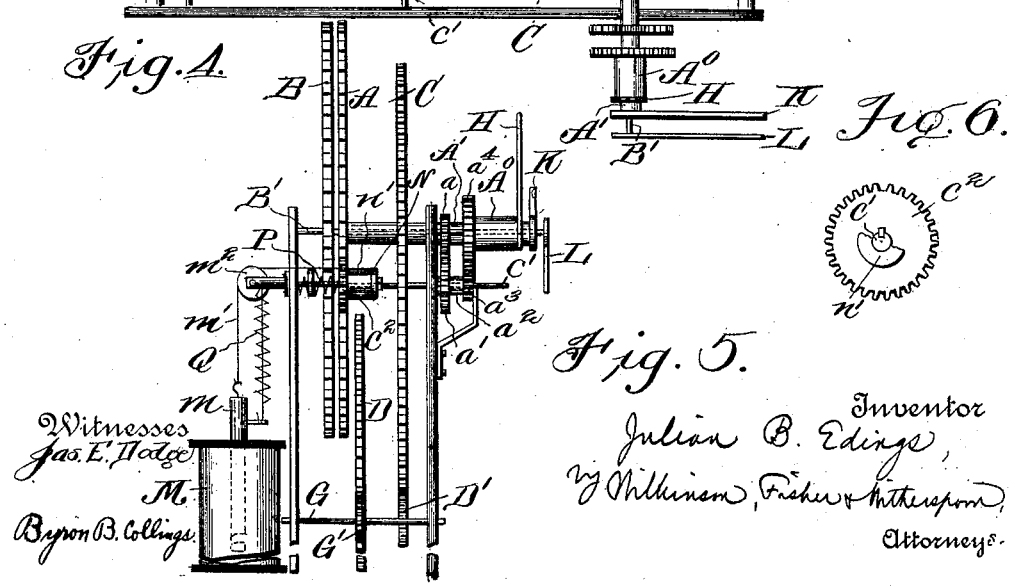

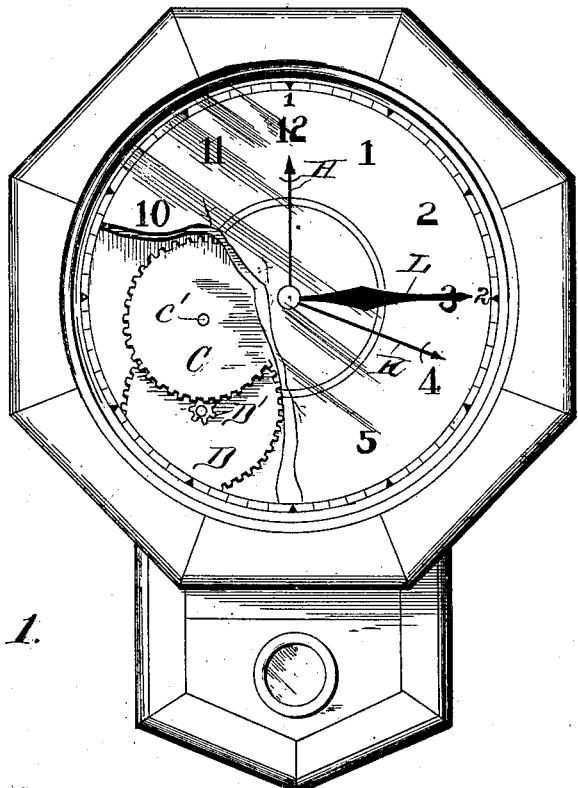

J. B. EDINGS.
TRAIN INDICATING APPARATUS.
APPLICATION FILED SEPT. 20, 1909. RENEWED NOV. 9, 1910.
996,069.
Patented June 27, 1911.
3 SHEETS—SHEET 3.
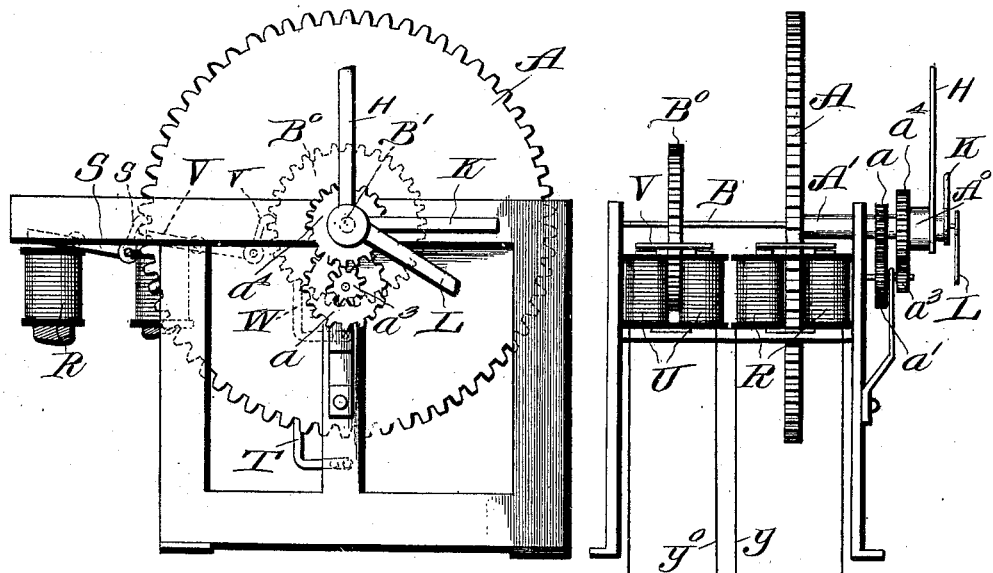
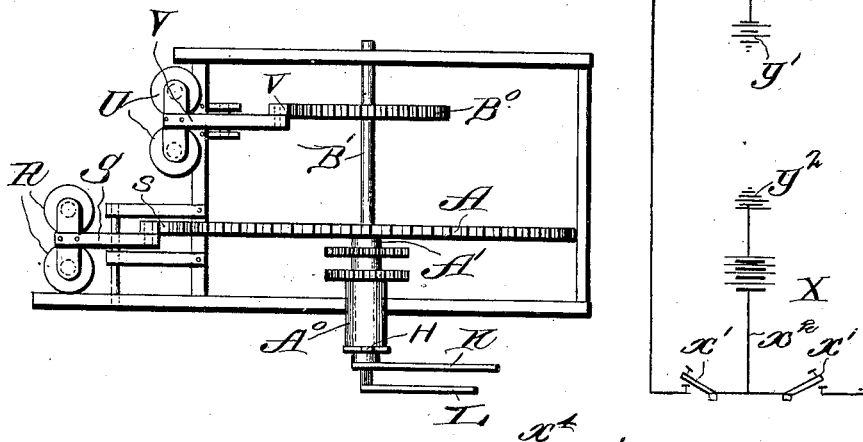

UNITED STATES PATENT OFFICE.

JULIAN B. EDINGS, OF MACON, GEORGIA.

TRAIN-INDICATING APPARATUS.

996,069.  Specification of Letters Patent.  Patented June 27, 1911.

Application filed September 20, 1909, Serial No. 518,579. Renewed November 9, 1910. Serial No. 591,514.

*To all whom it may concern:*

Be it known that I, JULIAN B. EDINGS, a citizen of the United States, residing at Macon, in the county of Bibb and State of Georgia, have invented certain new and useful Improvements in Train-Indicating Apparatus; and I do hereby declare the following to be a full, clear, and exact description of the invention, such as will enable others skilled in the art to which it appertains to make and use the same.

My invention relates to improvements in apparatus for indicating the expected arrival or departure of trains, and it consists in providing an electrically-operated indicator provided with a plurality of hands intended to indicate one or more trains, and also to indicate the time of arrival or departure of said train or trains; these hands being electrically controlled by an operator at the central station.

The invention may include the control of either a single instrument at one station, or the simultaneous control of a plurality of instruments located at various stations. Thus, for instance, it might be desirable to have the time of the expected arrival of a train indicated both at the station at which the train is due, and also at one or more hotels or other places where such information would be desired.

According to this invention, each railroad running into a certain station is represented at that station, and also at other places, if desired, with one or more clock faces on which are represented the respective trains whose arrival or departure is to be noted. Each clock face is provided with one or more hands to point to the special train or trains, and with hour and minute hands to correspond to the time of arrival or departure of the train, and these hands are set by suitable electrical apparatus, such as will be hereinafter described.

Reference is had to the accompanying drawings, in which:—

Figure 1 represents one of a plurality of dummy clocks located at the station where the indications are to be made. Fig. 2 indicates a group of these dummy clocks assembled at the station where indications are to be made. Fig. 3 shows the interior of a dummy clock with the gearing for operating the hands. Fig. 4 is a plan view of the device shown in Fig. 3, and shows also the driving motor. Fig. 5 is an elevation of the device shown in Fig. 4, as seen on the left of same, the driving motor being omitted. Fig. 6 is a detail, showing on a larger scale the sliding pinion for driving different trains of gearing, as may be desired. Fig. 7 is a side elevation of another form of device for accomplishing the same results. Fig. 8 is an end view, and Fig. 9 a plan view, of the apparatus shown in Fig. 7, while Fig. 10 shows a convenient form of switch for imparting the step by step motion desired.

The mechanism is preferably mounted in a casing bearing the general similitude of a clock, as shown in Fig. 1, and groups of these clocks may be assembled together, as indicated in Fig. 2.

Referring first to the apparatus shown in Figs. 3 to 6, A represents a gear wheel mounted on the hollow shaft A', which hollow shaft carries at one end an arm K, intended to represent the minute hand of the clock. Journaled in this shaft A' is a hollow sleeve A°, carrying an arm H intended to represent the hour hand of the clock. These two hour and minute hands are geared together with the usual gearing $a$, $a'$, $a^3$, and $a^4$, see Fig. 5, so that they have the proper relative movement, this construction being well known in the art of clock making. Concentric with the shaft A' and the sleeve A°, but independent therefrom, is a shaft B', carrying the gear wheel B, the front end of which shaft carries the arm L, which points to the number of the train whose time of arrival is to be indicated by the hands H and K. Thus, by reference to Fig. 1, train No. 2 is shown as due to arrive at 18 minutes past 12. C represents another gear wheel, fast on the shaft C', on which shaft is keyed the sliding pinion $C^2$, which pinion is normally held in engagement with one of the gears A or B, and may be thrown into engagement with the other gear or pinion, being disengaged from the first by mechanism that will hereinafter be described. D represents a gear which is mounted on the same shaft with the pinion D', which pinion meshes in the gear C. The pinion G', meshes in the pinion D, and is fast on the shaft G, driven by the motor E, which may be controlled from any suitable switch F, see Fig. 4. M represents an electromagnet whose core $m$ is attached to a cord $m'$, passing over the pulley $m^2$ and connected to the cross piece N, which carries the sleeves $n$, $n'$, sliding on the rod O, and on the shaft $C'$, respectively. The sleeve $n'$ bears against the pinion $C^2$, and the opposite side of the pinion is pressed against by the spring P, which normally holds this pinion $C^2$ in engagement with the gear A, as shown in Fig. 4. The core of the electromagnet is normally supported by the springs P and Q, but when a sufficiently strong current is passed through the magnet the core $m$ will be drawn down against the action of these springs, until the sleeve $n$ strikes against the stop $o$ on the rod O, and the pinion $C^2$ is shifted from the gear A to the gear B.

In the operation of the device, it is supposed that there is a suitable telltale apparatus, or other well known signaling apparatus, at the central station, which will indicate the position of the hands of the corresponding apparatus at the sub-stations. Such telltale apparatus being well known in the electrical art, it is not deemed necessary to further illustrate or describe the same. Assuming such telltale apparatus to be provided, the operation of the device is as follows:—Suppose it is desired to indicate that train No. 2, for instance, see Fig. 1, is to arrive at 18 minutes past 12—turn on a reduced current through any suitable rheostat, not shown, and move the telltale apparatus at the central station until it indicates 18 minutes past 12; this will first set the motor E in operation, the current passing through the electromagnet M not being strong enough to overcome the action of the springs Q and P; and the gear $C^2$ being held in engagement by the spring P with the gear A, the cycle of operations will be as follows: The motor E will drive the shaft G and pinion $G'$, this will turn the gear D and pinion $D'$, driving the gear C, and the sliding pinion $C^2$, the latter being in engagement with the gear A; the shaft $A'$ will be rotated, turning the minute hand directly, and by the gears $a$, $a'$, $a^3$ and $a^4$, turning the hour hand also; so that these two hands may be moved to the proper position to correspond with that indicated on the telltale at the central station; when the current is cut off. In order to turn the station pointer L, a stronger current is run through the motor and through the electromagnet, and this current will cause the core of the magnet to slide the pinion $C^2$ on the shaft $C'$, against the action of the spring P, disengaging said pinion from the gear A, and causing it to mesh with the gear B. The motor will now cause the gear B to rotate the shaft $B'$ until the pointer L is at the proper position, as indicated by the telltale at the central station, and then the circuit is broken. It will be obvious that any changes in the time of the expected arrival of the train may be indicated from the central station by further adjustment of the hour and minute hands.

It will be noted that I have shown the gears $a'$ $a^3$ connected together by the sleeve $a^2$, journaled on the shaft $C'$,—this for convenience in construction. But any suitable arrangement of gearing may be adopted that may be desired. It will also be noted that I have provided springs P and Q, but I do not mean to confine myself to any specific arrangement of springs, for these may be varied at will and also variations may be made in the method of throwing the pinion $C^2$ into and out of engagement with the respective gears A and B, all of which could be used without departing from the spirit of my invention.

In the form of device shown in Figs. 7 to 9, similar results are accomplished in a very similar manner. In this form of apparatus, the hollow shaft $A'$ of the gear wheel A carries the minute hand K, while the hour hand H, mounted on the hollow shaft $A^0$, is driven by suitable gearing $a$, $a'$, $a^3$ and $a^4$ from the shaft $A'$. The station indicating hand L is carried by the shaft $B'$, concentric with the hollow shafts $A'$ and $A^0$, and is driven by the gear $B^0$, as will be hereinafter described. The gear wheel A is caused to rotate by a step by step device, such as the electromagnet R, its armature S, and the pawl $s$, carried by said armature; the motion of the gear wheel A is checked by any suitable detent, such as T, see Fig. 7. The gear wheel $B^0$ is turned by a similar step by step device, such as the electromagnet U, its armature V and the pawl $v$ carried thereby. The battery, or other source of electric energy, is indicated by X, and the conductors $x^2$, $x$ and $x^0$ connect the battery X with the coils of the magnets R and U, respectively. The other ends of the magnet coils are connected by the conductors $y$ and $y^0$ to the ground $y'$. The battery X is also grounded, as at $y^2$. Suitable circuit closers, such as $x'$ (see Fig. 8) or $X'$ (see Fig. 10) complete the circuit through the respective magnet coils. It will be noted that every time the circuit is closed through the magnet R, or the magnet U, the pawl $s$, or the pawl $v$ will push the corresponding gear wheel through a limited angle, and when the circuit is broken again, the pawl will return to the initial position, ready for another stroke, while the gear wheel will be held against back lash by its detent T or W, as the case may be.

In Fig. 8, I have shown as a simple form of circuit closer the switches $x'$, which will necessitate a series of depressions and releases; but quicker results may be obtained by a circuit closer, such as is shown in Fig. 10, where the rotary circuit maker and breaker $X'$ is provided with a conducting hub $x^3$, conducting spokes $x^4$ and a handle $x^5$; the effect of rotating such a circuit closer will be to make and break the circuit in rapid succession, and thus impart a quick motion to the gear wheel drawn by the movement of the magnet armature.

It will be obvious that various other modifications might be made, which could be used without departing from the spirit of my invention.

Having thus described my invention, what I claim and desire to secure by Letters Patent of the United States, is:—

1. An apparatus of the character described, comprising a clock face and signs for indicating the stations marked thereon, hour and minute hands geared together and adapted to be mounted in front of said clock face, and a station pointer hand arranged in front of said clock face, electrically-operated means for simultaneously moving said hour and minute hands, and electrically-operated means for driving said station pointer hand, substantially as described.

2. An apparatus of the character described, comprising a clock face provided with hour and minute hands geared together, a gear wheel for driving the minute hand and through it the hour hand, a station pointer hand, also rotatively mounted in front of said clock face, with a second gear wheel for driving said station pointer hand, and electrically-operated means for driving either of said gear wheels from a distant point, substantially as described.

3. An apparatus of the character described, comprising a clock face provided with hour and minute hands mounted upon hollow concentric shafts geared together, a gear wheel for driving the minute hand and through it the hour hand, a station pointer hand having its shaft concentric with the two hollow shafts aforesaid, and rotatively mounted in front of said clock face, with a second gear wheel carried by said shaft for driving said station pointer hand, and means operated by electricity for rotating either of said gear wheels through a predetermined angle, substantially as described.

In testimony whereof, I affix my signature, in presence of two witnesses.

JULIAN B. EDINGS.

Witnesses:
J. B. WALL,
J. FREEMAN HART.